(12) United States Patent
Inamura

(10) Patent No.: US 6,800,044 B2
(45) Date of Patent: Oct. 5, 2004

(54) SPEED CHANGE CONTROL APPARATUS FOR CONTINUOUSLY VARIABLE TRANSMISSION

(75) Inventor: Koh Inamura, Tokyo (JP)

(73) Assignee: Fuji Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/846,295

(22) Filed: May 2, 2001

(65) Prior Publication Data

US 2001/0046912 A1 Nov. 29, 2001

(30) Foreign Application Priority Data

May 12, 2000 (JP) .................................. P. 2000-140046

(51) Int. Cl.$^7$ .............................................. F16H 61/00
(52) U.S. Cl. ......................................... 474/18; 474/28
(58) Field of Search ..................................... 474/18, 28

(56) References Cited

U.S. PATENT DOCUMENTS

| | | | |
|---|---|---|---|
| 4,772,249 A | * 9/1988 | Kouno et al. | ................. 474/28 |
| 4,778,435 A | * 10/1988 | Sugaya et al. | ................. 474/28 |
| 4,967,621 A | * 11/1990 | Soga et al. | .................... 477/49 |
| 5,298,000 A | * 3/1994 | Rattunde et al. | .............. 474/24 |
| 5,711,730 A | * 1/1998 | Friedman et al. | ............. 474/18 |

FOREIGN PATENT DOCUMENTS

| | | |
|---|---|---|
| DE | 39 00 204 | 7/1990 |
| DE | 41 31 931 | 4/1992 |
| DE | 43 31 266 | 3/1995 |
| EP | 0 834 680 | 4/1998 |
| JP | 60-95255 | 5/1985 |
| JP | 61-206862 | 9/1986 |
| JP | 10-196749 | 7/1996 |

OTHER PUBLICATIONS

European Search Report, dated Sep. 6, 2001.

\* cited by examiner

*Primary Examiner*—David A. Bucci
*Assistant Examiner*—Vicky A. Johnson
(74) *Attorney, Agent, or Firm*—Smith, Gambrell & Russell, LLP

(57) ABSTRACT

A continuously variable transmission having a primary pulley and a secondary pulley on which a belt wound on the primary pulley is fitted. The width of the groove on the primary pulley is adjusted by the oil pressure in the primary hydraulic chamber in the primary cylinder, the width of the groove on the secondary pulley is adjusted by the oil pressure in the secondary hydraulic chamber in the secondary cylinder. The switching operation between the speed change operation in a state in which the line pressure is supplied to the secondary hydraulic chamber and the primary pressure is supplied to the primary hydraulic chamber by the oil passage switching valve, and the speed change control in a state in which the line pressure is supplied to the primary hydraulic chamber and the primary pressure is supplied to the secondary hydraulic chamber can be performed.

12 Claims, 4 Drawing Sheets

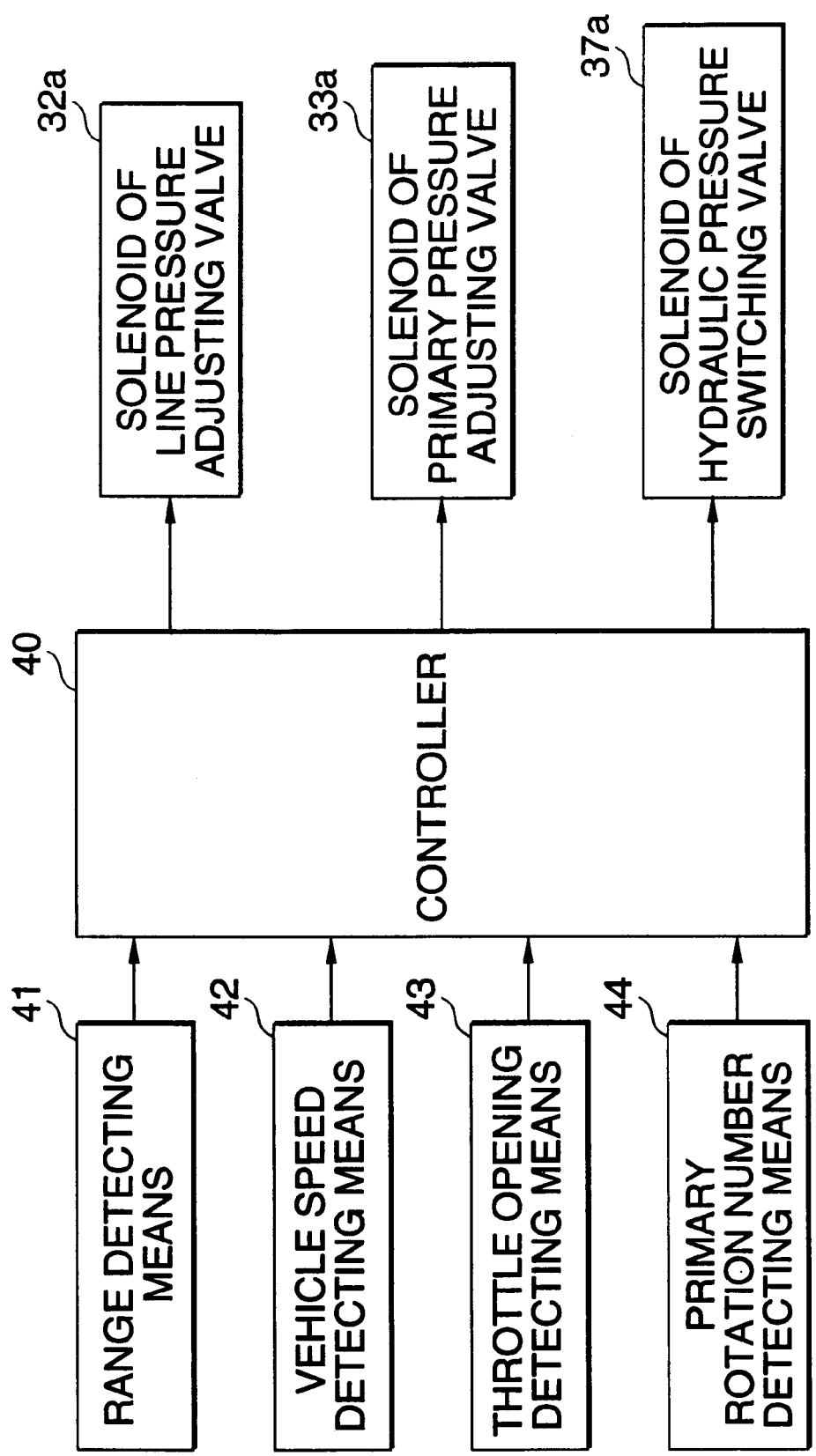

SPEED CHANGE CONTROL APPARATUS FOR CONTINUOUSLY VARIABLE TRANSMISSION

BACKGROUND OF THE INVENTION

The present invention relates to a speed change control apparatus for belt-driven continuously variable transmissions having a single cylinder as a primary cylinder for driving a primary pulley.

Conventionally, some of the belt-driven continuously variable transmissions (hereinafter, referring CVT) for automotive vehicles are constructed in such a manner that a metallic belt is wound between a primary (driving) pulley and a secondary (driven) pulley. The primary pulley is mounted on a primary shaft on the driving side, and has a pulley groove of a variable width. The secondary pulley is mounted on a secondary shaft on the driven (or following) side, and has a pulley groove of a variable width. Pulley diameters of the primary pulley and the secondary pulley may be varied by hydraulic pressure so as to continuously change the number of rotation of the secondary shaft.

The speed change control of the CVT is carried out by controlling the hydraulic pressure supplied to the primary cylinder provided on the primary pulley and the secondary cylinder provided on the secondary pulley. The hydraulic pressure supplied to the respective cylinders are generated by the oil pump driven by an engine. The line pressure supplied to the secondary cylinder, or the secondary pressure, is adjusted by the line pressure-adjusting valve, and the primary pressure supplied to the primary cylinder is adjusted by the primary pressure-adjusting valve with a line pressure as an original pressure. By adjusting the primary pressure to the value corresponding to the target speed change ratio or the speed-change velocity, the width of the groove of the primary pulley is changed to control the vehicle speed, and the line pressure is adjusted to the value corresponding to the transmissible capacity required to the belt.

Since the CVT of such a hydraulic system is adapted to adjust the primary pressure by depressurizing the line pressure, the primary pressure never exceeds the line pressure. Therefore, the effective area of the primary cylinder is determined to be larger than, about twice that of the secondary cylinder, since the up-shifting will be difficult unless otherwise the effective area of the primary cylinder is larger than the effective area of the secondary cylinder, in order to control the speed change by a hydraulic force of the primary cylinder.

Therefore, when the primary cylinder consists of a single cylinder, the diameter of the primary cylinder have to be larger than that of the secondary cylinder, which results in increase in the capacity of inertia of the primary cylinder.

Attempts have been made in the related art to construct the primary cylinder in a duplicated structure, or in double-cylindered structure, as in Japanese Patent Laid-Open No. 196749/1998. According to this technology, the effective area of the primary cylinder can be secured without increasing the diameter of the cylinder. However, the structure of the primary cylinder becomes complex, which results in increase in cost.

SUMMARY OF THE INVENTION

Accordingly, it is the object of the present invention to provide a primary cylinder in a single structure, while maintaining the small diameter of the primary cylinder.

The object can be achieved by a speed change control apparatus for continuously variable transmissions, according to the present invention, having a primary pulley to be mounted on a primary shaft and having a pulley groove with a variable width, a secondary pulley to be mounted on a secondary shaft and having a pulley groove with a variable width, a belt wound on both of that primary pulley and that secondary pulley, a primary cylinder mounted on the primary pulley and provided with a primary hydraulic chamber, and a secondary cylinder mounted on the secondary pulley and provided with a secondary hydraulic chamber. The speed change control apparatus comprises:

a line pressure adjusting valve for adjusting hydraulic fluid supplied from a oil pump into a line pressure;

a primary pressure adjusting valve for adjusting the line pressure into a primary pressure; and oil passage switching mechanism for switching an oil passage between a first condition and a second condition, wherein in the first condition, the line pressure is supplied to the secondary hydraulic chamber and the primary pressure is supplied to the primary hydraulic chamber, and wherein in the second condition, the line pressure is supplied to the primary hydraulic chamber and the primary pressure to the secondary hydraulic chamber.

In the speed change control apparatus for continuously variable transmissions, according to the present invention, it is advantageous that the effective area of the primary cylinder is determined to be almost the same as the effective area of the secondary cylinder, and also that the oil passage switching means switches the oil passage in the region of speed change ratio in which the belt winding diameters for the primary pulley and for the secondary pulley are almost the same.

Further, in the speed change control apparatus for continuously variable transmissions, according to the present invention, it is advantageous that the effective area of the primary cylinder is determined to be 5 to 60% larger than the effective area of the secondary cylinder.

Furthermore, in the speed change control apparatus for continuously variable transmissions according to the present invention, it is preferable to further comprise a controller for carrying out a speed change control in such a manner that the oil pressure to be supplied to the primary hydraulic chamber is adjusted in the low-speed region and that the oil pressure to be supplied to the secondary hydraulic chamber is adjusted in the high-speed region.

BRIEF DESCRIPTION OF THE DRAWINGS

FIG. 3 is a block diagram showing a speed change control circuit; and

DETAILED DESCRIPTION OF THE PREFERRED EMBODIMENTS

Figure 1:
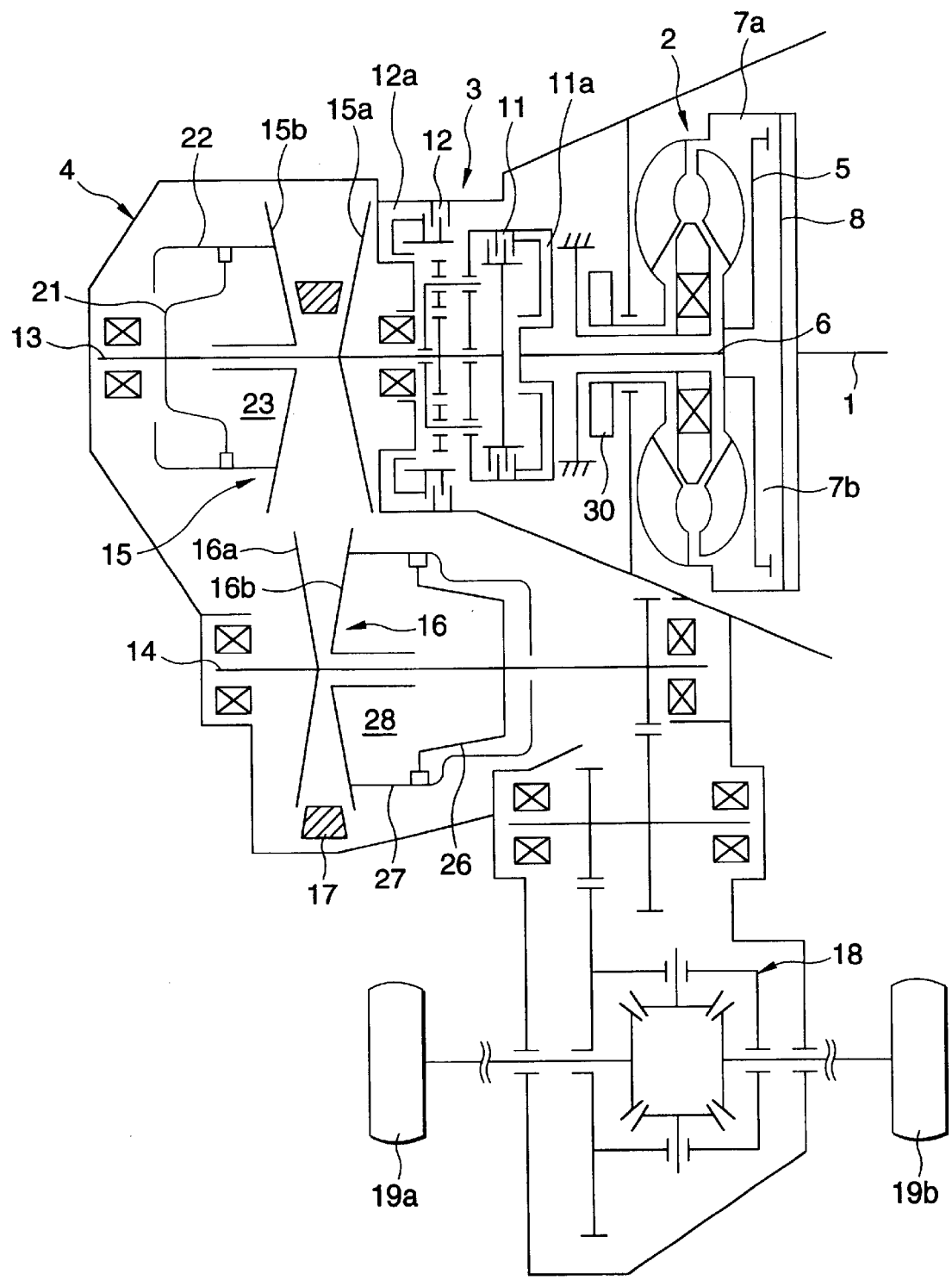
FIG. 1 is a schematic diagram showing an embodiment of the drive system for the belt-driven continuously variable transmissions.

Referring now to the drawings, an embodiment of the present invention will be described.

FIG. 1 is a schematic drawing showing an example of the belt-driven continuously variable transmission, or the CVT driving system, in which the rotation of a crank shaft 1 driven by an engine, which is not shown, is transmitted to a continuously variable transmission mechanism 4 via a torque converter 2 and a forward and reverse switching mechanism 3.

The torque converter 2 has a lockup clutch 5, which is connected to a turbine shaft 6. An apply chamber 7a is provided on one end of the lockup clutch 5, and a release chamber 7b is provided on the other end thereof. The torque converter 2 is brought into operation by circulating the oil pressure supplied to the release chamber 7b via the apply chamber 7a. In contrast to it, the lockup clutch 5 is engaged with a front cover 8 and thus brought into a locked-up state by supplying the oil pressure to the apply chamber 7a and lowering the oil pressure in the release chamber 7b. The slip pressure control is performed to slip the lockup clutch 5 by adjusting the pressure in the release chamber 7b.

The forward and reverse switching mechanism 3 comprises a forward clutch 11 (as a clutch for the forward movement) for transmitting the rotation of the turbine shaft 6 as an output shaft of the torque converter 2 to the continuously variable transmission mechanism 4 in the forward direction, and a reverse brake 12 (as a brake for reverse movement) for transmitting the same in the reverse direction. When an oil pressure is supplied to the clutch hydraulic chamber 11a and the forward clutch 11 is brought into connection, the rotation of the turbine shaft 6 is transmitted to the continuously variable transmission mechanism 4 in the forward direction, and when a oil pressure is supplied to the brake hydraulic chamber 12a and the reverse brake 12 is brought into connection, it is braked and transmitted in the reverse direction.

The continuously variable transmission mechanism 4 comprises an input shaft (i.e., the primary shaft 13) to be connected to the forward and reverse switching mechanism 3, and an output shaft (i.e., the secondary shaft 14) extended in parallel with the input shaft. The primary shaft 13 is provided with a primary pulley 15. The primary pulley 15 has a stationary pulley 15a fixed on the primary shaft 13 and a movable pulley 15b axially slidably fitted on the opposite side of the primary shaft 13 by a ball spline or the like. Accordingly, the distance between the conical surfaces of the pulley, or the width of the pulley groove can be varied.

The secondary shaft 14 is provided with a secondary pulley 16. The secondary pulley 16 has a stationary pulley 16a fixed on the secondary shaft 14 and a movable pulley 16b axially and slidably fitted on the opposite side of the secondary shaft 14 in the same manner as the movable pulley 15b. Accordingly, the width of the pulley groove can be varied.

A belt 17 is wound between the primary pulley 15 and the secondary pulley 16, so that the rotation of the primary shaft 13 is changed in speed in continuously variable manner and is transmitted to the secondary shaft 14 by changing widths of the grooves on both of the pulleys 15, 16 and a ratio between the winding diameters for the pulleys 15 and 16.

The rotation of the secondary shaft 14 is transmitted to the wheels 19a, 19b via a gear train including a reduction gear and a differential apparatus 18. In the case of front-wheel-drive vehicles, the wheels 19a, 19b are front wheels. The basic structure of the above-described driving system of the CVT is disclosed, for example, in Japanese Patent Laid-Open No.325458/1998.

In order to change the width of the groove on the primary pulley 15, a plunger 21 having a cylindrical portion and a disk portion is fixed on the primary shaft 13, and a primary cylinder 22 which slidably contacts with the outer peripheral surface of the plunger 21 is fixed on the movable pulley 15b, and a primary hydraulic chamber 23 is formed between the plunger 21 and the movable pulley 15b.

In order to change the width of the groove on the secondary pulley 16, a plunger 26 having a tapered cylindrical portion is fixed on the secondary shaft 14, the secondary cylinder 27 which slidably contacts with the outer peripheral surface of the plunger 26, and a secondary hydraulic chamber 28 is formed between the plunger 26 and the movable pulley 16b. In the case shown in FIG. 1, the diameter of the primary cylinder 22 is almost the same as that of the secondary cylinder 27, and both of the effective areas are determined to be almost the same.

When the hydraulic fluid is supplied to the primary hydraulic chamber 23 in the primary cylinder 22 to increase the capacity thereof, the movable pulley 15b moves toward the stationary pulley 15a together with the cylinder 22, and thus the width of the pulley groove is lessened, and when the capacity is reduced, the width of the pulley groove increases. When the operation hydraulic fluid is supplied to the secondary hydraulic chamber 28 in the secondary cylinder 27 to increase the capacity thereof, the movable pulley 16b moves toward the stationary pulley 16a together with the cylinder 27 so that the width of the groove on the pulley is reduced, and when the capacity is reduced, the width of the pulley groove increases.

Figure 2:
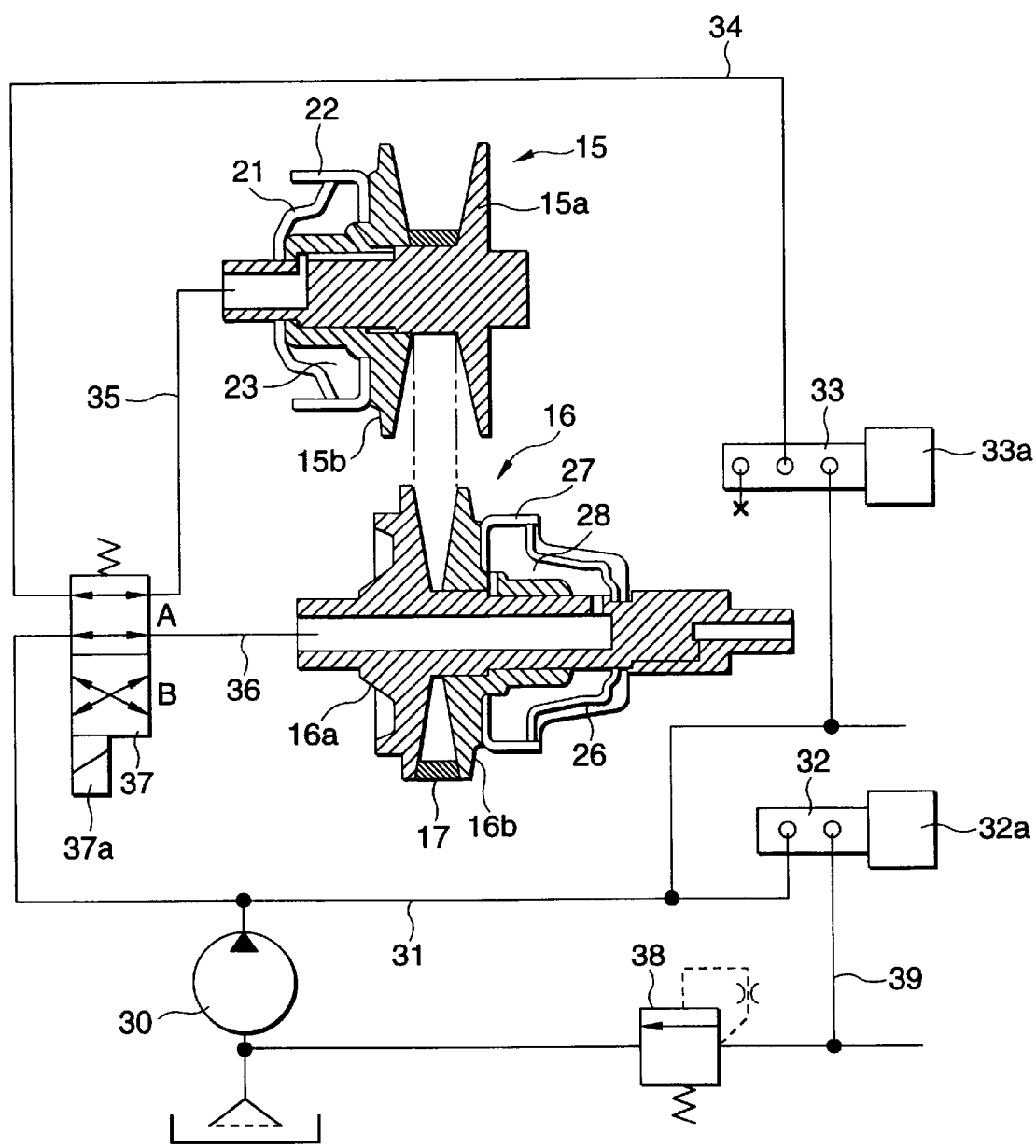
FIG. 2 is a hydraulic circuit diagram for performing the speed change operation.

FIG. 2 is a circuit diagram of the hydraulic pressure for supplying the hydraulic fluid to the primary cylinder 22 and the secondary cylinder 27 to carry out the speed change operation. The outlet port of the oil pump 30 to be driven by an engine is connected to the pressure adjusting port of the line pressure adjusting valve 32 via a line pressure passage 31, and the line pressure (secondary pressure) is adjusted by the line pressure adjusting valve 32 according to the input torque to the CVT or the speed change ratio.

The line pressure passage 31 is connected to the input port of the primary pressure adjusting valve 33, which adjusts the hydraulic pressure in the primary pressure passage 34 to a primary pressure using the line pressure as an original pressure. The primary pressure is adjusted according to the velocity of the vehicle, the number of rotation of the primary pulley, and the extent of opening of the throttle.

Both of the line pressure adjusting valve 32 and the primary pressure adjusting valve 33 are proportional valves, which can adjust a pressure to a desired value with in a prescribed range of pressure.

A primary line 35 is connected to the primary hydraulic chamber 23 in the primary cylinder 22 and a secondary line 36 is connected to the secondary hydraulic chamber 28 in the secondary cylinder 27.

The oil passage shown in FIG. 2 is provided with a switchover valve 37 to switch between two positions (A) and (B) when the solenoid 37a is energized. The switchover valve 37 switches between the position (A) in which the line pressure is supplied to the secondary hydraulic chamber 28, and the primary pressure is supplied to the primary hydraulic chamber 23 by establishing communication between the line pressure passage 31 and the secondary line 36 and between the primary pressure passage 34 and the primary line 35, and the position (B) in which the line pressure is supplied to the primary hydraulic chamber 23 and the primary pressure is supplied to the secondary hydraulic chamber 28 by establishing communication between the line pressure passage 31 and the primary line 35 and between the primary pressure passage 34 and the secondary line 36.

A lubricant pressure adjusting valve 38 is provided between the drain port of the line pressure adjusting valve 32 and the inlet of the oil pump 30, so that the oil with lubricant pressure supplied to the lubricant pressure passage 39 is adjusted with the drain pressure of the line pressure adjusting valve as an original pressure, and the hydraulic fluid at the lubricant pressure is supplied to the lubricating portion of the forward and reverse switching mechanism 3, the lubricating portion of the belt 17, and the like. A clutch pressure adjusting valve, which is not shown in the figure, is connected to the line pressure passage 31, so that the clutch pressure is adjusted by the clutch pressure adjusting valve while using the line pressure as an original pressure. The hydraulic fluid at the clutch pressure is supplied to the clutch hydraulic chamber 11a of the forward clutch 11 and the brake hydraulic chamber 12a of the reverse brake 12 of the forward and reverse switching mechanism 3, and to the apply chamber 7a of the lock-up clutch 5.

The oil pressure circuit for supplying the hydraulic fluid at the clutch pressure and the lubricant pressure to the forward and reverse switching mechanism 3 is the same as the one disclosed in the publication of Japanese Patent Laid-Open No. 325458/1998 described above.

FIG. 3 is a block diagram showing the speed change control circuit. The controller 40 having a central processing unit or a memory is connected with range detecting means 41 for detecting a prescribed range selected by a selecting lever, vehicle velocity detecting means 42 for detecting the velocity of the vehicle, throttle opening detecting means 43 for detecting the extent of opening of the throttle valve, and the primary pulley speed detecting means 44 for detecting the number of rotation of the primary pulley 15, so that the control signals are fed to the solenoid 32a of the line pressure adjusting valve 32, the solenoid 33a of the primary pressure adjusting valve 33, and the solenoid 37a of the oil passage switching valve 37 based on the detected signals.

Figure 4A:
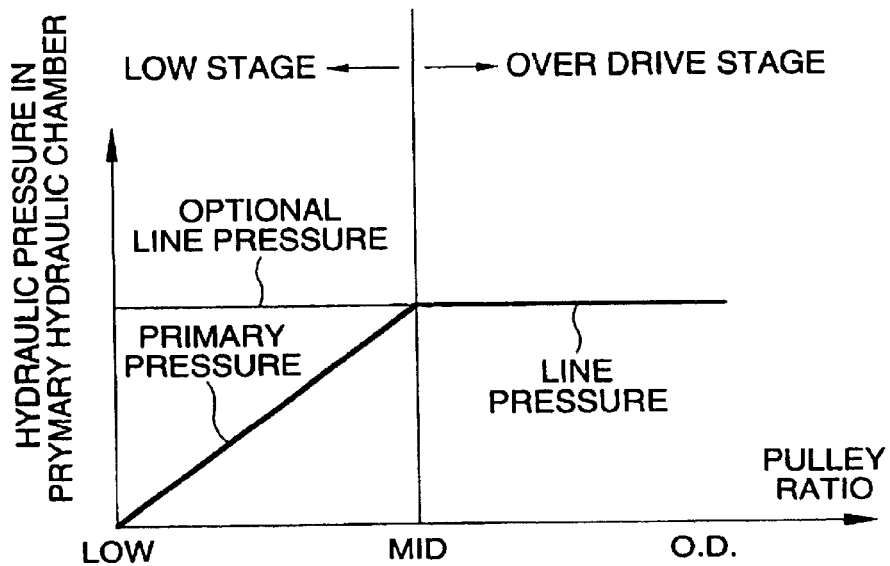
FIGS. 4A and 4B are timing charts showing the relation between the oil pressures of the primary and secondary pulley hydraulic chambers.
Figure 4B:
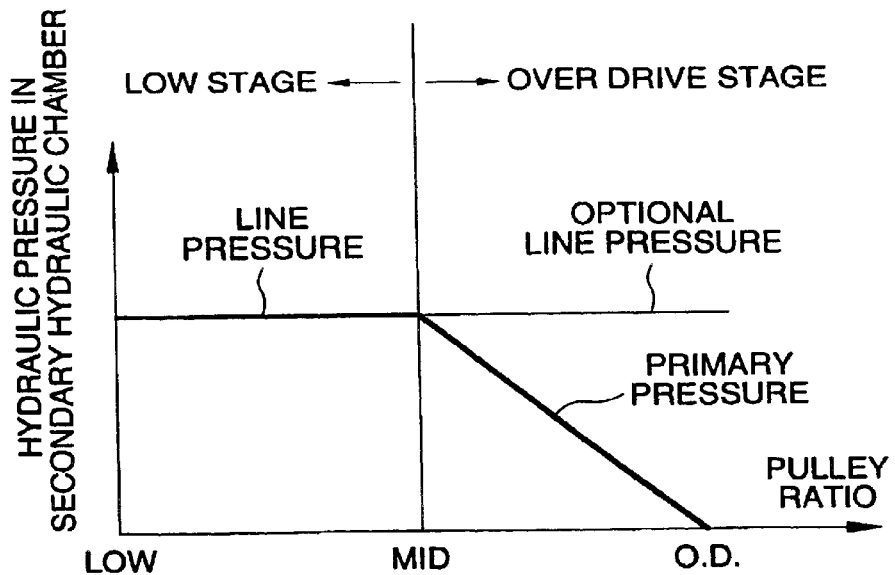

FIG. 4A and FIG. 4B are timing chart showing the relation between the oil pressure in the primary hydraulic chamber 23 and the oil pressure in the secondary hydraulic chamber 28 according to the pulley ratio, or the speed change ratio, and the timing of the operation of the oil passage switching valve 37. In this timing chart, the area on the left side of the intermediate speed change ratio (MID), or the speed change ratio in which the belt winding diameter of the primary pulley 15 and the belt winding diameter of the secondary pulley 16 are the same (speed change ratio i=1), is a low speed stage, or LOW stage, and the area on the right side thereof is a high speed stage, or the over drive stage.

The line pressure can always be set to a desired value between zero and the maximum line pressure by the line pressure-adjusting valve 32. As shown in FIG. 4A and FIG. 4B, in the LOW stage area, the line pressure is introduced as an oil pressure in the secondary hydraulic chamber 28, so that the speed change control is performed by adjusting the oil pressure in the primary hydraulic chamber 23, or the primary pressure, in the range from zero to the line pressure. On the other hand, in the overdrive stage area, the line pressure is introduced as an oil pressure in the primary hydraulic chamber 23 and the primary pressure is introduced in the secondary hydraulic chamber 28 so that the speed change control is performed by adjusting the primary pressure in the range from zero to the line pressure.

The oil passage switching valve 37 supplies the line pressure to the secondary hydraulic chamber 28 in the area in which the pulley ratio is smaller than the MID point, or the LOW-side stage in which the speed change ratio is large, and is set to the position where the primary pressure is supplied to the primary hydraulic chamber 23. At this moment, the belt winding diameter of the primary pulley 15 is smaller than that of the secondary pulley 16, and the primary pressure is adjusted by the primary pressure adjusting valve 33 within the range between zero and the lowest pressure (approx. 0.5 Mpa) at the LOW position. For example, when the primary pressure is zero, the oil pressure in the primary hydraulic chamber 23 is reduced to zero, and a clamping force of the primary pulley 15 becomes smaller than the clamping force of the secondary pulley 16, so that the pulley ratio is in the state of LOW position. When the primary pressure supplied to the primary hydraulic chamber 23 of the primary cylinder 22 is increased by the primary pressure adjusting valve 33 from the state of LOW position, the belt winding diameter of the primary pulley 15 increases, and thus the speed change ratio is changed to the MID side, or the intermediate speed change ratio, to perform the up-shift speed change.

On the other hand, when the primary pressure and the line pressure are almost the same, the effective areas of the primary cylinder 22 and the secondary cylinder 27 are set to the identical value, thus the clamping forces of the primary pulley 15 and the secondary pulley 16 become almost the same and the pulley ratio becomes the MID state. When the primary pressure is set to a desired value within the range from zero to the line pressure, it is stabilized at the prescribed pulley ratio within the range between LOW and MID due to the relation between the clamping forces of both of the pulleys.

When the primary pressure is slightly shifted toward the line pressure while maintaining the line pressure in the stabilized state, the clamping force of the primary pulley 15 increases by the extent corresponding to the slightly shifted oil pressure, and as a consequent, the relation between the primary clamping force and the secondary clamping force looses its stability, and the pulley ratio is shifted toward the MID position, and then the relation is stabilized again upon completion of the shift, thereby accomplishing the up-shift operation.

When the primary pressure is slightly shifted toward zero while the line pressure is maintained in the stabilized state, the clamping force of the primary pulley 15 decreases by the extent corresponding to the slightly shifted oil pressure, and as a consequent, the relation between the clamping forces of both of the pulleys looses its stability, and the pulley ratio is shifted toward the LOW position, and then the relation is stabilized again upon completion of the shift, thereby accomplishing the down-shift operation.

Being increased to the value equivalent to the line pressure by the up-shift operation, the primary pressure increases to the MID position in which the speed change ratio i=1. However, since the line pressure is used as the original pressure of the primary pressure, further up-shift operation cannot be made under the primary pressure.

Therefore, the switching operation is made by energizing the solenoid 37a of the oil passage switching valve 37, so that the line pressure is supplied to the primary hydraulic chamber 23 and the primary pressure is supplied to the secondary hydraulic chamber 28. As a consequent, the speed change control from the MID position to the OD at which the speed change ratio is the smallest can be made by adjusting the primary pressure supplied to the secondary hydraulic chamber 28.

In other words, since the connection between the respective adjusting valves 32, 33 and the pulley cylinder under the speed change ratio from MID to OD is the reverse of the case from LOW position to MID position, the primary pressure is supplied to the secondary hydraulic chamber 28 and the line pressure is supplied to the primary hydraulic chamber 23. Though the oil pressure in the primary hydraulic chamber 23 is now equivalent to the line pressure, the primary pressure to be adjusted by the primary pressure adjusting valve 33 can be adjusted in the range from zero to the maximum line pressure. For example, assuming that the primary pressure is zero, the oil pressure of the secondary hydraulic chamber 28 can be reduced to zero with the line pressure supplied to the primary hydraulic chamber 23. However, the oil pressure in the secondary hydraulic chamber 28 is not actually reduced to zero in order to generate the belt clamping force.

As regards the clamping force of the primary pulley 15 and the clamping force of the secondary pulley 16, the primary side may be set to the larger value than the secondary side. Therefore, the pulley ratio is set to the OD state. On the other hand, when the primary pressure and the line pressure are set to the same value, the pulley ratio will be brought into the MID state as described above. By setting the primary pressure is set to the desired value within the range of the line pressure, the pulley ratio can be stabilized in a constant value within the range between MID and OD due to the relation between the clamping force of the primary cylinder 22 and the clumping force of the secondary cylinder 27.

When the primary pressure is slightly shifted toward zero while maintaining the line pressure in the stabilized state, the clamping force of the secondary pulley 16 decreases by the extent corresponding to the slightly shifted oil pressure, and as a consequent, the relation between the clamping force of the primary pulley 15 and the clamping force of the secondary pulley 16 looses its stability, and the pulley ratio is shifted toward the OD state, and then the relation is stabilized again upon completion of the shift, thereby accomplishing the up-shift operation.

When the primary pressure is slightly shifted toward the line pressure while maintaining the line pressure in the stabilized state described above, the clamping force of the secondary pulley 16 increases by the extent corresponding to the slightly shifted oil pressure, and as a consequent, the relation between the clamping forces of the primary pulley 15 and of the secondary pulley 16 looses its stability, and the pulley ratio is shifted toward the MID, and then the relation is stabilized again upon completion of the shift, thereby accomplishing the down-shift operation.

In the above described case, the switching operation of the oil passage is performed by the oil passage switching valve 37 when the effective diameters of the primary cylinder 22 and of the secondary cylinder 27 are set to the same value and, in turn the belt winding diameters of the primary pulley 15 and the secondary pulley 16 are almost the same. However, it is also possible to set the effective diameter of the primary cylinder 22 to the larger value than the effective diameter of the secondary cylinder 27, so that the switching operation is performed at the position slightly shifted from the MID position shown in FIGS. 4A and B toward the OD side. In such a case, the primary cylinder 22 is active in terms of speed change control, but when considering the increase in the capacity of inertia of the primary cylinder 22, it is preferable to increase the effective diameter of the primary cylinder 22 within the range from b 5 l to b 60% of the effective diameter of the secondary cylinder 27.

The present invention is not limited to the embodiment described above, but it will be understood that the changes and variations may be made without departing from the scope of the invention. For example, as regards the drive system for belt-driven continuously variable transmissions, the present invention may be applied not only to the case shown in FIG. 1, but also to various types such as a type having no torque converter 2.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

According to the present invention, since the speed change control in a state in which the line pressure is supplied to the secondary hydraulic chamber and the primary pressure is supplied to the primary hydraulic chamber and the speed change control in a state in which the line pressure is supplied to the primary hydraulic chamber and the primary pressure is supplied to the secondary hydraulic chamber can be switched, the diameter of the primary cylinder can be miniaturized.

The effective diameter of the primary cylinder can be set to almost the same value as the effective diameter of the secondary cylinder.

Since the diameter of the primary cylinder can be reduced, the capacity of inertia thereof can be reduced, thereby increasing the speed change responsivity.

Since the primary cylinder can be constructed as a single cylinder, the manufacturing cost of the continuously variable transmission can be reduced.

What is claimed is:

1. A speed change control apparatus for a continuously variable transmission for a vehicle having, a driving wheel provided under said vehicle for driving thereof by a driving power through a crankshaft from an engine, a primary shaft mechanically and coaxially connected to said crankshaft for receiving said driving power, a primary pulley provided on said primary shaft for axially changing a width, a secondary shaft provided in parallel with said primary shaft, a secondary pulley provided on said secondary shaft for transmitting said power through a belt wound on both of said pulleys and for changing each rotating speed depending on driving conditions of said vehicle, a primary cylinder formed on an outer periphery of one side of said primary pulley for including a primary oil chamber, a secondary cylinder formed on said outer periphery of one side of said secondary pulley for including a secondary oil chamber, an oil pump mounted on said vehicle for supplying an actuating fluid to said primary and secondary oil chambers via a pressure line, said speed change control apparatus comprising:

a line pressure control valve interposed in said pressure line between said oil pump and said primary oil chamber for adjusting an oil pressure therebetween to a line pressure;

a primary pressure control valve interposed in said pressure line between said line pressure control valve and said primary oil chamber for adjusting an oil pressure therebetween to a primary pressure; and a switchover valve interposed in said pressure line between said oil pump and said secondary cylinder for switching to supply said actuating fluid of said line pressure to said secondary oil chamber and to supply said actuating fluid of said primary pressure and of said line pressure as much as required for shifting to said primary oil chamber when said vehicle runs at a low speed and for switching to supply said actuating fluid of said line pressure to said primary pressure oil chamber and to supply said actuating fluid of said primary pressure and of said line pressure as much as required for shifting to said secondary oil chamber when said vehicle runs at a high speed so as to effectively decrease an inertia capacity of said primary cylinder by decreasing a diameter of said a primary cylinder thereby to improve responsiveness of a speed change.

2. The speed change control apparatus according to claim 1, wherein an effective area of the primary cylinder is substantially equal to an effective area of the secondary cylinder, and wherein the switchover valve switches to change said supply within a predetermined region of a speed change ratio where a belt winding diameter of said primary pulley becomes substantially equal to a belt winding diameter of said secondary pulley.

3. The speed change control apparatus according to claim 2, wherein an effective area of the primary cylinder is substantially equal to an effective area of the secondary cylinder, and wherein the switchover valve switches to change said supply when a speed change ratio defined by belt winding diameters of said primary and secondary pulleys is within a predetermined value.

4. The speed change control apparatus according to claim 3, wherein the switchover valve switches to change said supply when the belt winding diameter of said primary pulley becomes substantially equal to the belt winding diameter of said secondary pulley.

5. The speed change control apparatus according to claim 1, wherein an effective area of the primary cylinder is set to be 5 to 60% larger than an effective area of the secondary cylinder.

6. The speed change control apparatus according to claim 1, further comprising:
a controller for carrying out a speed change control in such a manner that the oil pressure to be supplied to the primary oil chamber is adjusted in a low-speed region and that the oil pressure to be supplied to the secondary oil chamber is adjusted in a high-speed region.

7. A vehicle equipped with a continuously variable transmission said vehicle having a driving wheel provided under said vehicle for driving by driving power supplied through a crankshaft from an engine, a primary shaft mechanically and coaxially connected to said crankshaft for receiving said driving power, a primary pulley provided on said primary shaft for axially changing a width, a secondary shaft provided in parallel with said primary shaft, a secondary pulley provided on said secondary shaft for transmitting said power through a belt wound on both of said pulleys and for changing each rotating speed depending on driving conditions of said vehicle, a primary cylinder formed on an outer periphery of one side of said primary pulley for including a primary oil chamber, a secondary cylinder formed on said outer periphery of one side of said secondary pulley for including a secondary oil chamber, an oil pump mounted on said vehicle to supply an actuating fluid to said primary and secondary oil chambers via a pressure line, and a speed change control apparatus comprising:

a line pressure control valve interposed in said pressure line between said oil pump and said primary oil chamber for adjusting an oil pressure therebetween to a line pressure;

a primary pressure control valve interposed in said pressure line between said line pressure control valve and said primary oil chamber for adjusting an oil pressure therebetween to a primary pressure; and a switchover valve interposed in said pressure line between said oil pump and said secondary cylinder for switching the supply of said actuating fluid of said line pressure to said secondary oil chamber and to supply said actuating fluid with said primary pressure to said primary oil chamber when said vehicle runs at a low speed and for switching the supply of said actuating fluid of said line pressure to said primary oil chamber and to supply said actuating fluid of said primary pressure to said secondary oil chamber when said vehicle runs at a high speed so as to effectively decrease an inertia capacity of said primary cylinder by decreasing a diameter of said a primary cylinder thereby to improve responsiveness of a speed change.

8. The vehicle according to claim 7, wherein an effective area of the primary cylinder is substantially equal to an effective area of the secondary cylinder, and wherein the switchover valve switches to change said supply within a predetermined region of a speed change ratio where a belt winding diameter of said primary pulley becomes substantially equal to a belt winding diameter of said second pulley.

9. The vehicle according to claim 8, wherein an effective area of the primary cylinder is substantially equal to an effective area of the secondary cylinder, and wherein the switchover valve switches to change said supply when a speed change ratio defined by belt winding diameters of said primary and secondary pulleys is within a predetermined value.

10. The vehicle according to claim 9, wherein the switchover valve switches to change said supply when the belt winding diameter of said primary pulley becomes substantially equal to the belt winding diameter of said secondary pulley.

11. The vehicle according to claim 7, wherein an effective area of the primary cylinder is set to be 5 to 60% larger than an effective area of the secondary cylinder.

12. The vehicle according to claim 7, further comprising:
a controller for carrying out speed change control in such a manner that the oil pressure to be supplied to the primary oil chamber is adjusted in a low-speed region and that the oil pressure to be supplied to the secondary oil chamber is adjusted in a high-speed region.

* * * * *

UNITED STATES PATENT AND TRADEMARK OFFICE
CERTIFICATE OF CORRECTION

PATENT NO. : 6,800,044 B2
DATED : October 5, 2004
INVENTOR(S) : Inamura, Koh

It is certified that error appears in the above-identified patent and that said Letters Patent is hereby corrected as shown below:

<u>Title page,</u>
Item [73], Assignee, should read as follows:
-- [73]   Assignee: Fuji Jukogyo Kabushiki Kaisha, Tokyo (JP) --

Signed and Sealed this

Thirty-first Day of May, 2005

JON W. DUDAS
*Director of the United States Patent and Trademark Office*